G. LEUFFGEN.
TANK FURNACE FOR MAKING GLASS.
No. 103,208. Patented May 17 1870.
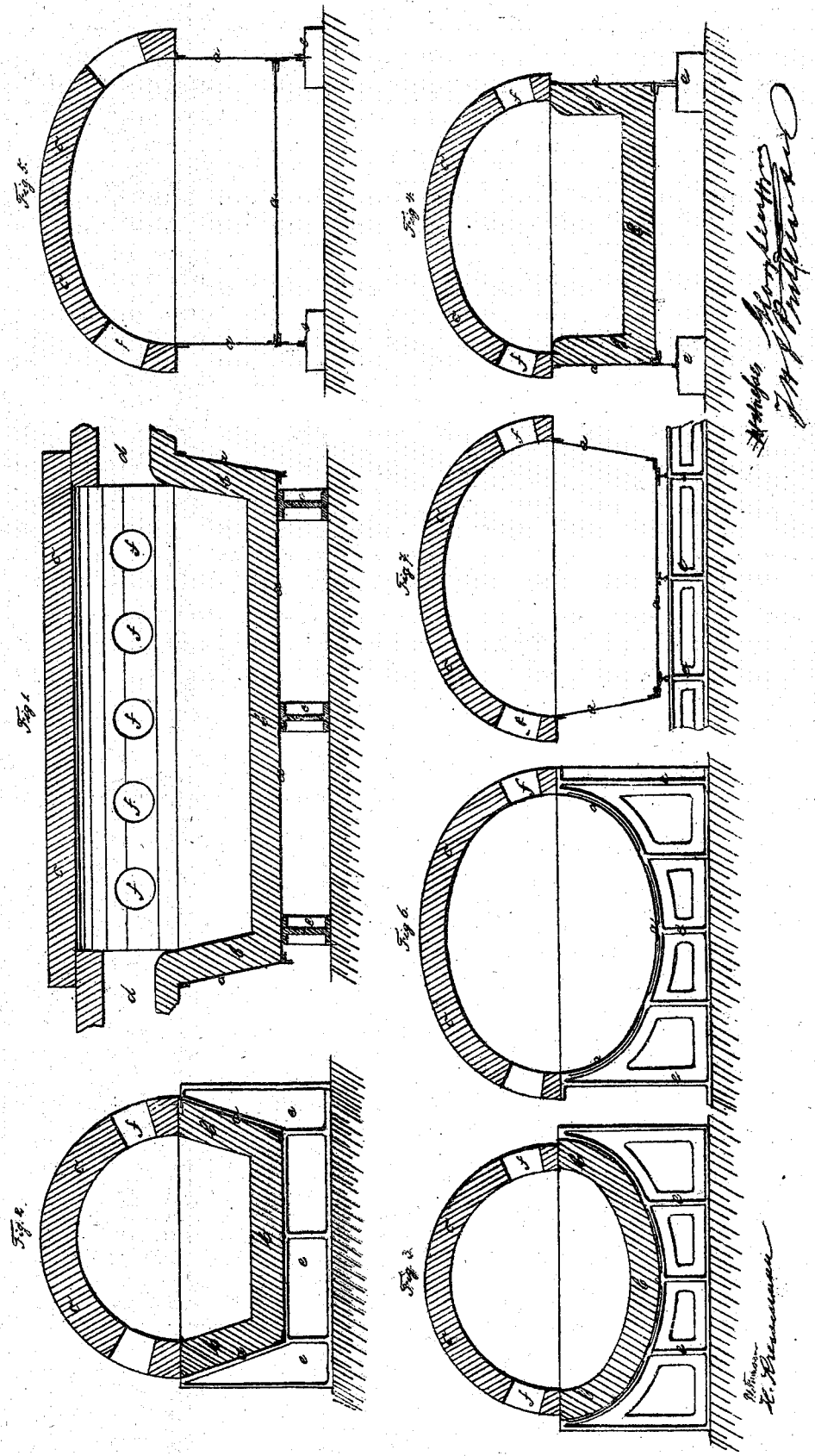

United States Patent Office.

GEORG LEUFFGEN, OF CHARLOTTENBURG, NEAR BERLIN, PRUSSIA.

Letters Patent No. 103,208, dated May 17, 1870.

IMPROVED TANK-FURNACE FOR MAKING GLASS.

The Schedule referred to in these Letters Patent and making part of the same.

*To all whom it may concern:*

Be it known that I, GEORG LEUFFGEN, of Charlottenburg, near Berlin, in the Kingdom of Prussia, have invented a new and useful Improvement in Glass Tank-Furnace; and I do hereby declare the following to be a full, clear, and exact description thereof, which will enable those skilled in the art to make and use the same, reference being had to the accompanying drawing forming part of this specification, in which drawing—

Figure 1 is a longitudinal section of my invention.
Figure 2 is a transverse section thereof.
Figures 3 and 4 are transverse sections of my invention, showing a lining of refractory material in the body of the tank.
Figures 5, 6, and 7 are transverse sections, in which the refractory lining is dispensed with.

My invention relates to improvements in the construction of melting-tank furnace for the manufacture of glass; and It consists in making the tank of iron or other suitable metal.

Also, in combining the same with a roof of refractory material.

Also, in lining the metallic tank with refractory material.

Also, in so constructing the tank-furnace that the flames enter the oven and act directly upon the surface of the material on the hearth.

Also, in exposing the tank on all its surfaces to contact with the atmosphere or any other cooling agency, so as to keep the sides and bottom of the tank cool, thereby preventing the destruction of the same.

The letter *a* designates my metallic tank, which is arched over by a roof, *c*, of refractory material, made with two openings, *d d*, one at each end, for the introduction of the flame, which I produce either by burning fuel directly on fire-grates, arranged at one or on both ends of the tank, or by the introduction of combustible gases into the furnace.

The material to be melted is put into the tank and is acted upon by the flame passing over its surface, and the side openings *f* give the workmen access to the interior of the tank, and the flames can leave the oven either through the side openings or through an opening specially provided for that purpose.

I support the tank above the floor upon a substructure, *e*, of open-work, which allows a free circulation of air to pass beneath, so as to cool the bottom of the tank.

The cooling of the tank may also be promoted by an artificial draught of air made to act on all sides of the tank, and such a draught can be produced by a chimney or a blowing-engine, or water can be used as a means of cooling.

I line the interior of the tank with refractory material, *b*, and support the arched roof *c* upon the lining, as shown in fig. 2.

My invention embraces the metallic tank with and without the lining *b*, and, when it is used without the lining, the roof *c* is supported directly upon the walls of the tank and upon the substructure *e*, as illustrated in figs. 3 and 7.

The tank can be varied in size and also in form, (as is illustrated in the modifications shown in the different figures,) according to the quantity and quality of glass to be produced.

In the unlined tank the sides and bottom are preserved from injury by the cooling effects of the atmosphere or water, causing a coating of chilled glass to form on the outside.

What I claim as new, and desire to secure by Letters Patent, is—

1. A melting-tank for the manufacture of glass, composed of metal, substantially as described.
2. The arched metallic tank-furnace for the manufacture of glass, provided with openings for the introduction and eduction of flames to reduce the material in the tank, and with working openings, substantially as described.
3. The combination of the metallic arched tank-furnace *a* for the manufacture of glass, with an internal lining, *b*, of refractory material, substantially as described.
4. A metallic tank for the manufacture of glass, arranged in the manner described, that its outside surface is exposed to the action of cooling agencies, substantially as and for the purpose described.

GEORG LEUFFGEN.

Witnesses:
H. KREISMANN,
J. H. F. PRILLWITZ.